United States Patent
Moon et al.

(10) Patent No.: US 9,487,623 B2
(45) Date of Patent: Nov. 8, 2016

(54) PREPARATION METHOD OF POLYCYCLOHEXYLENEDIMETHYLENE TEREPHTHALATE RESIN HAVING EXCELLENT COLOR, AND POLYCYCLOHEXYLENEDIMETHYLENE TEREPHTHALATE RESIN PREPARED BY THE SAME

(71) Applicant: SK CHEMICALS CO., LTD., Gyeonggi-do (KR)

(72) Inventors: Jung-Me Moon, Gyeonggi-do (KR); Tae-Young Kim, Gyeonggi-do (KR); Jong Ryang Kim, Gyeonggi-do (KR)

(73) Assignee: SK CHEMICALS CO., LTD. (KR)

( * ) Notice: Subject to any disclaimer, the term of this patent is extended or adjusted under 35 U.S.C. 154(b) by 0 days.

(21) Appl. No.: 14/430,518

(22) PCT Filed: Sep. 24, 2013

(86) PCT No.: PCT/KR2013/008538
§ 371 (c)(1),
(2) Date: Mar. 23, 2015

(87) PCT Pub. No.: WO2014/046519
PCT Pub. Date: Mar. 27, 2014

(65) Prior Publication Data
US 2015/0252143 A1   Sep. 10, 2015

(30) Foreign Application Priority Data

Sep. 24, 2012  (KR) .................. 10-2012-0106006

(51) Int. Cl.
| | | |
|---|---|---|
| C08G 63/02 | (2006.01) | |
| C08G 63/86 | (2006.01) | |
| C08G 63/85 | (2006.01) | |
| C08G 63/199 | (2006.01) | |
| C08G 63/183 | (2006.01) | |

(52) U.S. Cl.
CPC ........... C08G 63/863 (2013.01); C08G 63/183 (2013.01); C08G 63/199 (2013.01); C08G 63/85 (2013.01)

(58) Field of Classification Search
CPC .............................. C08G 63/85; C08G 63/78
USPC ......................................... 528/271, 272, 279
See application file for complete search history.

(56) References Cited

U.S. PATENT DOCUMENTS

| | | |
|---|---|---|
| 4,468,489 A | 8/1984 | Weinberg |
| 4,859,732 A | 8/1989 | Minnick |
| 4,972,015 A | 11/1990 | Carico et al. |
| 5,106,944 A | 4/1992 | Sublett |
| 5,124,388 A | 6/1992 | Pruett et al. |
| 5,242,967 A | 9/1993 | Minnick |
| 5,596,068 A | 1/1997 | Kramer et al. |
| 2006/0216448 A1 | 9/2006 | Keep |
| 2011/0313102 A1 | 12/2011 | Kojima |
| 2012/0322934 A1 | 12/2012 | Gallucci |

FOREIGN PATENT DOCUMENTS

| | | | |
|---|---|---|---|
| CN | 1216051 | 5/1999 | |
| CN | 101346427 | 1/2009 | |
| EP | 1302498 | 4/2003 | |
| JP | 2002-220442 | 8/2002 | |
| JP | 4048373 B2 | 12/2007 | |
| KR | 10-1997-0002080 A | 2/1997 | |
| KR | 10-2006-0018129 A | 2/2006 | |
| KR | 10-2008-0109264 A | 12/2008 | |
| KR | 10-2009-0021716 A | 3/2009 | |
| KR | 10-2009-0041974 A | 4/2009 | |
| KR | 20090041974 | * 4/2009 | ............. C08G 63/85 |
| WO | WO 2006-121121 A1 | 11/2006 | |

OTHER PUBLICATIONS

Translation of KR 20090041974 date Apr. 2009.*
International Search Report prepared by the Korean Intellectual Property Office on Nov. 26, 2013, for International Application No. PCT/KR2013/008538.
Extended Search Report for European Patent Application No. 13838860.8, dated May 2, 2016, 7 pages.

* cited by examiner

Primary Examiner — Terressa Boykin
(74) Attorney, Agent, or Firm — Sheridan Ross P.C.

(57) ABSTRACT

A preparation method of a polycyclohexylenedimethylene terephthalate resin according to the present invention includes the steps of injecting a titanium compound and a germanium compound as catalysts to a mixture of a diol compound and dicarboxylic acid under stirring and performing esterification reaction and polycondensation reaction, in which the titanium compound is injected in a titanium atom content of 20 ppm or less, based on the weight of the final polycyclohexylenedimethylene terephthalate resin. The preparation method of the polycyclohexylenedimethylene terephthalate resin according to the present invention can be used to prepare a polycyclohexylenedimethylene terephthalate resin that has excellent degree of polymerization, color and light reflectance and has remarkably improved heat stability, and it is suitable to use the polycyclohexylenedimethylene terephthalate resin according to the present invention as an LED housing material.

16 Claims, No Drawings

PREPARATION METHOD OF POLYCYCLOHEXYLENEDIMETHYLENE TEREPHTHALATE RESIN HAVING EXCELLENT COLOR, AND POLYCYCLOHEXYLENEDIMETHYLENE TEREPHTHALATE RESIN PREPARED BY THE SAME

CROSS REFERENCE TO RELATED APPLICATIONS

This application is a national stage application under 35 U.S.C. 371 and claims the benefit of PCT Application No. PCT/KR2013/008538 having an international filing date of Sep. 24, 2013, which designated the United States, which PCT application claimed the benefit of Korean Patent Application No. 10-2012-0106006 filed Sep. 24, 2012, the disclosures of each of which are incorporated herein by reference.

TECHNICAL FIELD

The present invention relates to a preparation method of a polycyclohexylenedimethylene terephthalate resin, and a polycyclohexylenedimethylene terephthalate resin prepared by the same. More particularly, the present invention relates to a preparation method of a polycyclohexylenedimethylene terephthalate resin having excellent color, and a polycyclohexylenedimethylene terephthalate resin prepared by the same.

BACKGROUND ART

Poly(alkylene terephthalate) has excellent physical properties such as abrasion resistance, durability, heat stability, etc., and thus has been used as a material for making fiber, film and molding products. Poly(ethylene terephthalate) (hereinafter, referred to as 'PET'), poly(butylene terephthalate) (hereinafter, referred to as 'PBT'), and polycyclohexylenedimethylene terephthalate (poly(1,4-cyclohexylenedimethylene terephthalate), hereinafter, referred to as 'PCT') are commercial polyalkylene terephthalate. Among them, the most widely used commercial material is PET that is mainly used for fibers, bottles, or the like.

In spite of its excellent physical properties, PET needs a nucleating agent and a crystallization accelerator as a processing aid when used as engineering plastics that are required to have high crystallinity, and the production rate becomes low or the mold temperature must be controlled to maintain a high crystallization rate during an injection molding process, because it has a relatively low crystallization rate.

Meanwhile, since PBT has a higher crystallization rate than PET, it overcomes the above mentioned problems in physical properties of PET used in engineering plastics, namely, the low crystallization rate, and thus has been widely used in engineering plastics. However, PBT has lower heat deflection temperature than PET, and thus its use in applications requiring high heat resistance has been limited, despite its excellent moldability compared to PET.

Meanwhile, PCT has attracted much attention as a new material capable of overcoming the above described problems of polyester materials, that is, the moldability problem due to slow crystallization rate and the limited applications due to low heat deflection temperature.

Such PCT is a crystalline polyester prepared by esterification or ester exchange reaction and polycondensation reaction of terephthalic acid (hereinafter, referred to as TPA) or dimethyl terephthalate (hereinafter, referred to as DMT) and 1,4-cyclohexanedimethanol (hereinafter, referred to as CHDM), and has a very high melting point (Tm) and a very fast crystallization rate. Since the first development in 1960, PCT have been mainly applied to carpets owing to a soft touch of the PCT fiber. However, the use of PCT has been gradually declining with the emergence of polyamide. Since PCT compound formulations were developed in the engineering plastic fields in the 1980s, they have been applied only to the connectors and heat resistant parts in electrical, electronic and automobile fields requiring high heat-resistance.

PCT has excellent heat resistance, chemical resistance, moisture resistance and flowability, compared to the widely used polyesters, PET and PBT. In particular, PCT has a heat deflection temperature of 245 to 260° C. and a continuous-use temperature of 130 to 150° C. Therefore, of the commercial non-wholly aromatic polyesters, excluding liquid crystalline polyesters, PCT is the only engineering plastic belonging to super engineering plastics as alternatives to metals, such as polyamide, polyphenylene sulfide, and liquid crystalline polymer. Particularly, PCT has very excellent color stability and remarkably low water absorption rate, compared to other polymer resins such as polyamide or the like, and therefore, it can be usefully applied to electronic materials that are produced by high temperature surface mount technology or housings or reflectors of LED (Light Emitting Diode) that are continuously exposed to heat and light during use of the product.

U.S. Pat. No. 5,106,944 discloses a process for preparing PCT using DMT and CHDM as main materials and titanium alkoxide and alkaline earth metal salts as catalysts, and U.S. Pat. No. 5,124,388 discloses a technology for improving colors of PCT copolyester and PCT copolyester/polycarbonate blend by using hindered phenolic stabilizers. In these patents, however, germanium compounds were not used as a catalyst.

Further, U.S. Pat. No. 5,596,068 discloses a polyester resin for producing thick-walled bottles having high transparency and a neutral color by using an antimony compound, a germanium compound, and a phosphorus compound. However, this patent is characterized by including CHDM of 0.5~15% by weight and the resin has a great difference with PCT resins. In particular, there is no mention of the remarkable improvement in its color and light reflectance by use of the germanium catalyst.

U.S. Pat. No. 4,972,015 discloses a thin-walled, thermoformed, heat-set article, which is prepared by using PCT and PCT copolyester having an intrinsic viscosity of 0.7~1.1, and U.S. Pat. No. 5,242,967 discloses a method for improving crystallization characteristics of PCT by addition of aliphatic polyester. Further, U.S. Pat. No. 4,859,732 discloses a PCT compound formulation that is added with linear alcohols and glass reinforcing fibers to improve crystallization characteristics and strength of PCT.

However, the conventional technologies proposed only the composition for improving crystallization characteristics and color in the compound step, and there have been no reports on a preparation method capable of basically improving color stability and heat stability of PCT in a PCT polymerization step.

DISCLOSURE

Technical Problem

The present invention provides a preparation method of a polycyclohexylenedimethylene terephthalate resin having excellent color and improved heat stability.

Technical Solution

A preparation method of a polycyclohexylenedimethylene terephthalate resin according to one aspect of the present invention includes the steps of injecting a titanium compound and a germanium compound as catalysts to a mixture of a diol compound and dicarboxylic acid under stirring and performing esterification reaction and polycondensation reaction, and the titanium compound is injected in a titanium atom content of 20 ppm or less, based on the weight of the final polycyclohexylenedimethylene terephthalate resin.

Further, the germanium compound is injected in a germanium atom content of 30 to 1,000 ppm, based on the weight of the final polycyclohexylenedimethylene terephthalate resin.

In the above, the diol compound may include cyclohexanedimethanol (CHDM).

Herein, the diol compound may further include one or more selected from the group consisting of ethylene glycol, diethylene glycol, 1,4-butanediol, 1,3-propanediol, and neopentyl glycol.

In the above, the dicarboxylic acid may include terephthalic acid (TPA) or dimethylterephthalic acid (DMT).

Herein, the dicarboxylic acid may further include one or more selected from the group consisting of isophthalic acid (IPA), naphthalene 2,6-dicarboxylic acid (2,6-NDA), dimethyl isophthalic acid (DMI), and dimethyl naphthalene 2,6-dicarboxylic acid (2,6-NDC).

Further, the titanium compound may be selected from the group consisting of titanium oxide, a titanium chelate compound, tetra-n-propyl titanate, tetra-isopropyl titanate, tetra-n-butyl titanate, tetra-isobutyl titanate, and butyl-isopropyl titanate.

Further, the germanium compound may be germanium dioxide.

Furthermore, the preparation method may further include the step of injecting a phosphorus-based stabilizer.

Herein, the phosphorus-based stabilizer may be selected from the group consisting of tri-ethyl phosphate, tri-methyl phosphate, tri-phenyl phosphate, tri-ethyl phosphonoacetate, phosphoric acid, and phosphorous acid.

A polycyclohexylenedimethylene terephthalate resin according to another aspect of the present invention may have an intrinsic viscosity of 1.10 dl/g or less and a color-L value of 87 or higher and a color-b value of 4 or lower after heat treatment at 150° C. for 1 hour.

The polycyclohexylenedimethylene terephthalate resin according to another aspect of the present invention has the titanium atom content of 20 ppm or less, based on the weight of the final polycyclohexylenedimethylene terephthalate resin.

In the above, the germanium compound may be further included in a germanium atom content of 30 to 1,000 ppm, based on the weight of the final polycyclohexylenedimethylene terephthalate resin.

Furthermore, the phosphorus compound may be further included in a phosphorus atom content of 30 to 1,000 ppm, based on the weight of the final polycyclohexylenedimethylene terephthalate resin.

Advantageous Effects

A preparation method of a polycyclohexylenedimethylene terephthalate resin according to the present invention can be used to prepare a polycyclohexylenedimethylene terephthalate resin that has excellent degree of polymerization, color and light reflectance and has remarkably improved heat stability, and it is suitable to use the polycyclohexylenedimethylene terephthalate resin according to the present invention as an LED housing material.

BEST MODE

The present invention may be variously modified and may have various embodiments. Particular embodiments of the present invention will be described in detail in the Detailed Description. However, the present invention is not limited to the particular embodiments and may be understood that the present invention includes any modification, equivalents, or alternatives that are included in the spirit and scope of the present invention. During description of the present invention, if it is considered that a detailed description about related disclosed art makes the present invention unclear, it will not be presented herein.

The present invention provides a preparation method of a polycyclohexylenedimethylene terephthalate resin, including the steps of injecting a titanium compound and a germanium compound as catalysts to a mixture of a diol compound and dicarboxylic acid under stirring and performing esterification reaction and polycondensation reaction, in which the titanium compound is injected in a titanium atom content of 20 ppm or less, based on the weight of the final polycyclohexylenedimethylene terephthalate resin.

Further, the present invention provides a polycyclohexylenedimethylene terephthalate resin having an intrinsic viscosity of 1.10 dl/g or less and a color-L value of 87 or higher and a color-b value of 4 or lower after heat treatment at 150° C. for 1 hour.

Meanwhile, the present invention provides a polycyclohexylenedimethylene terephthalate resin having a titanium atom content of 20 ppm or less, based on the weight of the final polycyclohexylenedimethylene terephthalate resin.

Hereinafter, a preparation method of a polycyclohexylenedimethylene terephthalate resin and a polycyclohexylenedimethylene terephthalate resin according to embodiments of the present invention will be described in more detail.

Generally, a non-wholly aromatic polyester resin is typically polymerized from dicarboxylic acid and a diol compound according to the method known in the art. A preparation method of the aromatic polyester resin may include the steps of (A) mixing a dicarboxylic acid compound, a diol compound, and a phosphorus-based stabilizer compound to perform esterification reaction, (B) adding a catalyst compound to the resultant obtained by the esterification reaction to perform polycondensation reaction, (C) extruding the polycondensation reactant to prepare a pellet, and if necessary, (D) crystallizing the pellet to perform solid-phase polymerization.

According to one embodiment of the present invention, provided is a preparation method of a polycyclohexylenedimethylene terephthalate resin, including the steps of injecting a titanium compound and a germanium compound as catalysts to a mixture of a diol compound and dicarboxylic acid under stirring and performing esterification reaction and polycondensation reaction, in which the titanium compound is injected in a titanium atom content of 20 ppm or less, based on the weight of the final polycyclohexylenedimethylene terephthalate resin.

The preparation method of the polycyclohexylenedimethylene terephthalate resin according to the present invention is characterized in that the titanium compound and the germanium compound are used as catalysts and the titanium compound is injected in a titanium atom content of 20 ppm or less, based on the weight of the final polycyclohexylenedimethylene terephthalate resin, and the germanium compound is injected in a germanium atom content of 30 to 1,000 ppm, based on the weight of the final polycyclohexylenedimethylene terephthalate resin.

Owing to addition of the germanium atom, the color-improving effect can be more effectively achieved. If the germanium atom content is less than 30 ppm, the color-improving effect is imperceptible, and if the germanium atom content is more than 1000 ppm, a side reaction may occur and it may remain in the polymer to increase a haze value.

In the above, the diol compound may contain cyclohexanedimethanol (CHDM), and may further contain one or more selected from the group consisting of ethylene glycol, diethylene glycol, 1,4-butanediol, 1,3-propanediol, and neopentyl glycol. That is, the diol compound generally refers to 1,4-cyclohexanedimethanol, but may further include one or more selected from the group consisting of ethylene glycol, diethylene glycol, 1,4-butanediol, 1,3-propanediol, and neopentyl glycol in a small amount.

Meanwhile, the dicarboxylic acid may include terephthalic acid (TPA) or dimethylterephthalic acid (DMT), and may further include one or more selected from the group consisting of isophthalic acid (IPA), naphthalene 2,6-dicarboxylic acid (2,6-NDA), dimethylisophthalic acid (DMI), and dimethyl naphthalene 2,6-dicarboxylic acid (2,6-NDC). That is, dicarboxylic acid to be used or a derivative thereof generally refers to terephthalic acid (TPA) or dimethylterephthalic acid (DMT), but may further include isophthalic acid (IPA), 2,6-naphthalenedicarboxylic acid (2,6-NDA), dimethylisophthalate (DMI), or dimethyl naphthalene 2,6-dicarboxylic acid (2,6-NDC) in a small amount.

Furthermore, in the preparation method according to the present invention, it is preferable that one of terephthalic acid (TPA) and dimethylterephthalic acid (DMT) is used as the dicarboxylic acid in an amount of 80 mol % or more, based on the mole number of the total acid, and it is preferable that cyclohexane dimethanol (1,4-cyclohexane dimethanol) is used as the diol compound in an amount of 80 mol % or more, based on the mole number of the total diol compound. If their amounts are less than the above mol %, the physical properties of the polyester become very different from those of PCT, and thus it is difficult to use the polyester in the applications developed to be suitable for the crystalline PCT resin.

In the present invention, the titanium compound is used as a catalyst, and the titanium compound may be selected from the group consisting of titanium oxide, a titanium chelate compound, tetra-n-propyl titanate, tetra-isopropyl titanate, tetra-n-butyl titanate, tetra-isobutyl titanate, and butyl-isopropyl titanate.

Further, the titanium compound may be injected in a titanium atom content of 20 ppm or less, based on the weight of the final polycyclohexylenedimethylene terephthalate resin. The content is limited to the above range, because an excessive content of titanium may cause a side reaction, deteriorate color and greatly reduce the molecular weight during processing.

The germanium compound may be germanium dioxide, and the germanium compound may be injected in a germanium atom content of 30 to 1,000 ppm, based on the weight of the final polycyclohexylenedimethylene terephthalate resin. If the content is less than 30 ppm, the color-improving effect is imperceptible, and if the content is more than 1000 ppm, a side reaction may occur and it may remain in the polymer to increase a haze value.

Furthermore, a phosphorus-based stabilizer may be further added to the mixture of the diol compound and dicarboxylic acid. This phosphorus-based stabilizer is preferably injected during the initial stage of the esterification reaction, and more preferably, prior to the esterification reaction. Preferably, the stabilizer is injected within a phosphorus atom content of 30 ppm, based on the weight of the final polycyclohexylenedimethylene terephthalate resin. If the content of the phosphorus-based stabilizer is more than 30 ppm, there are problems in that the polymer color deteriorates and the catalytic activity is reduced to increase the reaction time and the degree of polymerization.

Herein, the phosphorus-based stabilizer may be selected from the group consisting of tri-ethyl phosphate, tri-methyl phosphate, tri-phenyl phosphate, tri-ethyl phosphonoacetate, phosphoric acid, and phosphorous acid.

Further, in the present invention, the esterification reaction may be performed in the facilities known in the art under the similar reaction conditions, and preferably, at a temperature of 230-290° C. and a pressure of 0.0-3.0 kg/cm$^2$ for 4 to 10 hours. Further, it is preferable that the system is constituted to immediately remove water during the esterification reaction.

Meanwhile, the polycondensation reaction may be performed under the conditions of a temperature of 290-320° C. and a pressure of 0.1-2.0 torr for 100 to 300 minutes. It is preferable that the system is constituted to immediately remove cyclohexane dimethanol and by-products generated during the polycondensation reaction.

The solid-phase reaction may be performed under the conditions of a temperature of 230-270° C. and a vacuum of 0.2-2.0 torr, or under nitrogen atmosphere.

Meanwhile, most polymers are colored after polymerized. In particular, when they are exposed to excessive heat for a long time during polymerization, the color of the polymer material turns into dark yellow due to pyrolysis reaction and oxidation. Since the visual appearance of products, including color, is important, color of the polymer material is an important quality factor.

The PCT resin that is prepared according to the preparation method of the polycyclohexylenedimethylene terephthalate resin according to the present invention may have an intrinsic viscosity of 1.10 dl/g or less and a color-L value of 87 or higher and a color-b value of 4 or lower after heat treatment at 150° C. for 1 hour.

Meanwhile, the polycyclohexylenedimethylene terephthalate resin according to another aspect of the present invention has the titanium atom content of 20 ppm or less, based on the weight of the final polycyclohexylenedimethylene terephthalate resin. If the titanium content exceeds 20 ppm, a side reaction may frequently occur, the color may deteriorate, and the molecular weight may be greatly reduced during processing.

Furthermore, the polycyclohexylenedimethylene terephthalate resin may further have the germanium atom content of 30 to 1000 ppm, based on the weight of the final polycyclohexylenedimethylene terephthalate resin. If the germanium atom content is less than 30 ppm, the color-improving effect is imperceptible, and if the content is more than 1000 ppm, a side reaction may occur and it may remain in the polymer to increase a haze value.

MODE FOR INVENTION

Hereinafter, preferred embodiments of the present invention will be described in detail. However, these embodiments are for illustrative purposes only, and the scope of the present invention is not intended to be limited by these embodiments.

Example 1

55 Kg of 1,4-cyclohexanedimethanol (trans 70%), 48 Kg of terephthalic acid, 7 g of triethyl phosphate, 10 g of a titanium oxide-based catalyst (trade name: Hombifast PC manufactured by Sachtleben) (effective Ti ratio in catalyst: 15%), and 11.5 g of germanium dioxide were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Example 2

55 Kg of 1,4-cyclohexanedimethanol (trans 70%), 48 Kg of terephthalic acid, 7 g of triethyl phosphate, 10 g of a titanium oxide-based catalyst (trade name: Hombifast PC manufactured by Sachtleben) (effective Ti ratio in catalyst: 15%), and 23 g of germanium dioxide were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Example 3

55 Kg of 1,4-cyclohexanedimethanol (trans 70%), 48 Kg of terephthalic acid, 7 g of triethyl phosphate, 10 g of a titanium oxide-based catalyst (trade name: Hombifast PC manufactured by Sachtleben) (effective Ti ratio in catalyst: 15%), and 46 g of germanium dioxide were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Example 4

55 Kg of 1,4-cyclohexanedimethanol (trans 70%), 48 Kg of terephthalic acid, 7 g of triethyl phosphate, and 15 g of a titanium oxide-based catalyst (trade name: Hombifast PC manufactured by Sachtleben) (effective Ti ratio in catalyst: 15%) were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Example 5

55 Kg of 1,4-cyclohexanedimethanol (trans 70%), 48 Kg of terephthalic acid, 7 g of triethyl phosphate, 10 g of a titanium oxide-based catalyst (trade name: Hombifast PC manufactured by Sachtleben) (effective Ti ratio in catalyst: 15%), and 23 g of germanium dioxide were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes. Then, solid-phase polymerization was carried out at 240° C., thereby preparing a PCT polymer.

Comparative Example 1

55 Kg of 1,4-cyclohexanedimethanol (trans 70%), 48 Kg of terephthalic acid, 7 g of triethyl phosphate, and 20 g of a titanium oxide-based catalyst (trade name: Hombifast PC manufactured by Sachtleben) (effective Ti ratio in catalyst: 15%) were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Comparative Example 2

55 Kg of 1,4-cyclohexanedimethanol (trans 70%), 48 Kg of terephthalic acid, 7 g of triethyl phosphate, and 25 g of a titanium oxide-based catalyst (trade name: Hombifast PC manufactured by Sachtleben) (effective Ti ratio in catalyst: 15%) were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Comparative Example 3

55 Kg of 1,4-cyclohexanedimethanol (trans 70%), 48 Kg of terephthalic acid, 7 g of triethyl phosphate, and 40 g of a titanium oxide-based catalyst (trade name: Hombifast PC manufactured by Sachtleben) (effective Ti ratio in catalyst: 15%) were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Comparative Example 4

55 Kg of 1,4-cyclohexanedimethanol (trans 70%), 48 Kg of terephthalic acid, 7 g of triethyl phosphate, and 60 g of a titanium oxide-based catalyst (trade name: Hombifast PC manufactured by Sachtleben) (effective Ti ratio in catalyst: 15%) were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Comparative Example 5

55 Kg of 1,4-cyclohexanedimethanol (trans 70%), 48 Kg of terephthalic acid, 7 g of triethyl phosphate, 15 g of a titanium oxide-based catalyst (trade name: Hombifast PC manufactured by Sachtleben) (effective Ti ratio in catalyst: 15%) and 168.7 g of germanium dioxide were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Comparative Example 6

55 Kg of 1,4-cyclohexanedimethanol (trans 70%), 48 Kg of terephthalic acid, 7 g of triethyl phosphate, 25 g of a titanium oxide-based catalyst (trade name: Hombifast PC manufactured by Sachtleben) (effective Ti ratio in catalyst: 15%) and 168.7 g of germanium dioxide were added to a reactor, and esterification reaction was carried out while the temperature was elevated to 280° C. in atmospheric pressure for 3 hours, and polyester polycondensation reaction was also carried out at 300° C. and at a vacuum of 0.5 to 1 torr for 150 minutes, thereby preparing a PCT polymer.

Experimental Example 1

The intrinsic viscosity of each PCT resin obtained in Examples 1 to 5, and Comparative Examples 1 to 6 was measured in the following manner.

Experimental Example 2

The color of each PCT resin obtained in Examples 1 to 5, and Comparative Examples 1 to 6 was measured in the following manner.

The PCT resin was subjected to crystallization in a 150° C. convection oven for 1 hour, and then the color of the PCT resin was measured using a colorimeter.

CIE LAB index was used for color measurement. CIE LAB system is a color space coordinate system defined by CIE, based on the yellow-blue and green-red opponent channels recognized by human. L* value denotes the brightness (0~100; 0 represents black, 100 represents white), a* value represents the green-red (based on 0, +: red, −: green), and b* value represents the yellow-blue (based on 0, +: yellow, −: blue).

The conditions and physical properties of Examples and Comparative Examples as described above are shown in the following Table 1.

TABLE 1

| | Ti content [ppm] | Ge content [ppm] | Sb content [ppm] | P content [ppm] | Intrinsic viscosity [dl/g] | Color-L* after heat treatment at 150° C. for 1 hr | Color-b* after heat treatment at 150° C. for 1 hr |
|---|---|---|---|---|---|---|---|
| Example 1 | 10 | 75 | 0 | 10 | 0.70 | 88 | 2.2 |
| Example 2 | 10 | 150 | 0 | 10 | 0.69 | 90 | 1.5 |
| Example 3 | 15 | 300 | 0 | 10 | 0.67 | 92 | 1.1 |
| Example 4 | 15 | 0 | 0 | 10 | 0.67 | 90 | 2.5 |
| Example 5 | 10 | 150 | 0 | 10 | 0.85 | 91 | 2.5 |
| Comparative Example 1 | 21 | 0 | 0 | 8 | 0.67 | 85 | 4.5 |
| Comparative Example 2 | 24 | 0 | 0 | 8 | 0.70 | 86 | 4.8 |
| Comparative Example 3 | 48 | 0 | 0 | 9 | 0.72 | 82 | 7.5 |
| Comparative Example 4 | 72 | 0 | 0 | 10 | 0.69 | 71 | 11.5 |
| Comparative Example 5 | 15 | 1100 | 0 | 9 | 0.55 | 85 | 4.8 |
| Comparative Example 6 | 24 | 1100 | 0 | 8 | 0.56 | 86 | 5.1 |

The PCT resin was dissolved in o-chlorophenol at a concentration of 1.2 g/dl, and then intrinsic viscosity was measured using an Ubbelohde viscometer. The temperature of the viscometer was maintained at 35° C. When the time (efflux time) taken for the solvent to flow through sections inside the viscometer is defined as t, and the time taken for the solution to flow through the sections is defined as $t_0$, specific viscosity can be defined as follows, $$\eta_{sp} = \frac{t - t_0}{t_0}$$

wherein intrinsic viscosity was calculated by the following correction equation:

$$[\eta] = \frac{\sqrt{1 + 4A\eta_{sp}} - 1}{2Ac}$$

wherein A is the Huggins's constant of 0.247, and c is a concentration value of 1.2 g/dl.

As shown in Table 1, it can be seen that the preparation method of the polycyclohexylenedimethylene terephthalate resin according to the present invention is used to prepare a polycyclohexylenedimethylene terephthalate resin with excellent color and light reflectance, and it is suitable to use the polycyclohexylenedimethylene terephthalate resin according to the present invention as an LED housing material.

Although a specific embodiment of the present invention has been described in detail, those skilled in the art will appreciate that this description is merely a preferred embodiment and is not construed to limit the scope of the present invention. Thus, the substantial scope of the present invention will be defined by the accompanying claims and equivalents thereof.

What is claimed is:

1. A preparation method of a polycyclohexylenedimethylene terephthalate resin comprising the steps of injecting a titanium compound and a germanium compound as catalysts to a mixture of a diol compound and dicarboxylic acid under stirring and performing esterification reaction and polycondensation reaction, wherein the titanium compound is injected in a titanium atom content of 20 ppm or less, based on the weight of the final polycyclohexylenedimethylene terephthalate resin, wherein the polycyclohexylenedimethylene terephthalate resin has a color-L value of 87 or higher after heat treatment at 150° C. for 1 hour.

2. The preparation method according to claim 1, wherein the germanium compound is injected in a germanium atom content of 30 to 1,000 ppm, based on the weight of the final polycyclohexylenedimethylene terephthalate resin.

3. The preparation method according to claim 1, wherein the diol compound includes cyclohexanedimethanol (CHDM).

4. The preparation method according to claim 3, wherein the diol compound further includes one or more selected from the group consisting of ethylene glycol, diethylene glycol, 1,4-butanediol, 1,3-propanediol, and neopentyl glycol.

5. The preparation method according to claim 1, wherein the dicarboxylic acid includes terephthalic acid (TPA) or dimethylterephthalic acid (DMT).

6. The preparation method according to claim 5, wherein the dicarboxylic acid further includes one or more selected from the group consisting of isophthalic acid (IPA), naphthalene 2,6-dicarboxylic acid (2,6-NDA), dimethylisophthalic acid (DMI), and dimethyl naphthalene 2,6-dicarboxylic acid (2,6-NDC).

7. The preparation method according to claim 1, wherein the titanium compound is selected from the group consisting of titanium oxide, titanium chelate compound, tetra-n-propyl titanate, tetra-isopropyl titanate, tetra-n-butyl titanate, tetra-isobutyl titanate, and butyl-isopropyl titanate.

8. The preparation method according to claim 1, wherein the germanium compound is germanium dioxide.

9. The preparation method according to claim 1, further comprising the step of injecting a phosphorus-based stabilizer.

10. The preparation method according to claim 9, wherein the phosphorus-based stabilizer is selected from the group consisting of tri-ethyl phosphate, tri-methyl phosphate, tri-phenyl phosphate, tri-ethyl phosphonoacetate, phosphoric acid, and phosphorous acid.

11. A polycyclohexylenedimethylene terephthalate resin that is prepared by the method of claim 1.

12. The polycyclohexylenedimethylene terephthalate resin according to claim 11, wherein the polycyclohexylenedimethylene terephthalate resin has an intrinsic viscosity of 1.10 dl/g or less and a color-b value of 4 or lower after heat treatment at 150° C. for 1 hour, wherein the intrinsic viscosity is calculated by the following correction equation:

$$[\eta] = \frac{\sqrt{1+4A\eta_{sp}} - 1}{2Ac}$$

wherein A is the Huggins's constant of 0.247, c is a concentration value of 1.2 g/dL, and $\eta_{sp}$ is measured using an Ubbelohde viscometer at 35° C. after the polycyclohexylenedimethylene terephthalate resin is dissolved in o-chlorophenol at a concentration of 1.2 g/dL.

13. A polycyclohexylenedimethylene terephthalate resin having a titanium atom content of 20 ppm or less, based on the weight of the final polycyclohexylenedimethylene terephthalate resin, wherein the polycyclohexylenedimethylene terephthalate resin has a color-L value of 87 or higher after heat treatment at 150° C. for 1 hour.

14. The polycyclohexylenedimethylene terephthalate resin according to claim 13, further having a germanium atom content of 30 to 1,000 ppm, based on the weight of the final polycyclohexylenedimethylene terephthalate resin.

15. The polycyclohexylenedimethylene terephthalate resin according to claim 13, further having a phosphorus atom content of 30 ppm or less, based on the weight of the final polycyclohexylenedimethylene terephthalate resin.

16. The polycyclohexylenedimethylene terephthalate resin according to claim 13, wherein the polycyclohexylenedimethylene terephthalate resin has an intrinsic viscosity of 1.10 dl/g or less and a color-b value of 4 or lower after heat treatment at 150° C. for 1 hour, wherein the intrinsic viscosity is calculated by the following correction equation:

$$[\eta] = \frac{\sqrt{1+4A\eta_{sp}} - 1}{2Ac}$$

wherein A is the Huggins's constant of 0.247, c is a concentration value of 1.2 g/dL, and $\eta_{sp}$ is measured using an Ubbelohde viscometer at 35° C. after the polycyclohexylenedimethylene terephalate resin is dissolved in o-chlorophenol at a concentration of 1.2 g/dL.

* * * * *